United States Patent [19]

Paske et al.

[11] Patent Number: 4,894,534
[45] Date of Patent: * Jan. 16, 1990

[54] LOGGING APPARATUS AND METHOD

[75] Inventors: William C. Paske, Pearland; Richard F. Roesler, Houston, both of Tex.

[73] Assignee: Baroid Technology, Inc., E. Harris County, Tex.

[ * ] Notice: The portion of the term of this patent subsequent to May 9, 2006 has been disclaimed.

[21] Appl. No.: 4,107

[22] Filed: Jan. 16, 1987

Related U.S. Application Data

[63] Continuation-in-part of Ser. No. 872,949, Jun. 11, 1986, Pat. No. 4,829,176.

[51] Int. Cl.[4] .................................................. G01V 5/12
[52] U.S. Cl. .................................. 250/254; 250/264; 250/266; 250/269
[58] Field of Search ............... 250/254, 262, 264, 265, 250/266, 269

[56] References Cited

U.S. PATENT DOCUMENTS 4,596,926 6/1986 Coope ................................. 250/265
4,698,501 10/1987 Paske ................................. 250/265

FOREIGN PATENT DOCUMENTS 2179442 3/1987 United Kingdom ................ 250/254

Primary Examiner—Carolyn E. Fields
Attorney, Agent, or Firm—Browning, Bushman, Zamecki & Anderson

[57] ABSTRACT

Downhole measuring apparatus includes a gamma radiation source and at least two pairs of radiation detectors carried by a housing so that radiation may be emitted from the source and scattered by the environment of the housing and detected by the detectors. Each pair of detectors is arranged so that its detectors are positioned symmetrically on opposite sides of the longitudinal axis of the housing, and each pair of detectors, in combination with the radiation source, forms a different geometrical configuration so that, in general, the radiation counts obtained by the different pairs of detectors will not be redundant. The output signals from the detectors may be processed to provide data signals indicative of the radiation counts experienced by the detectors, and which may then be used to simultaneously obtain values for two or more downhole parameters. The addition of each new, independent pair of detectors permits the simultaneous solution of an additional downhole parameter.

34 Claims, 6 Drawing Sheets

FIG. 4
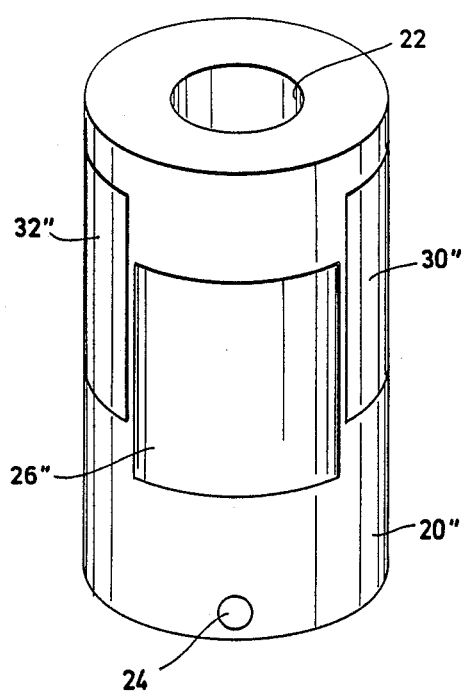
FIG. 5
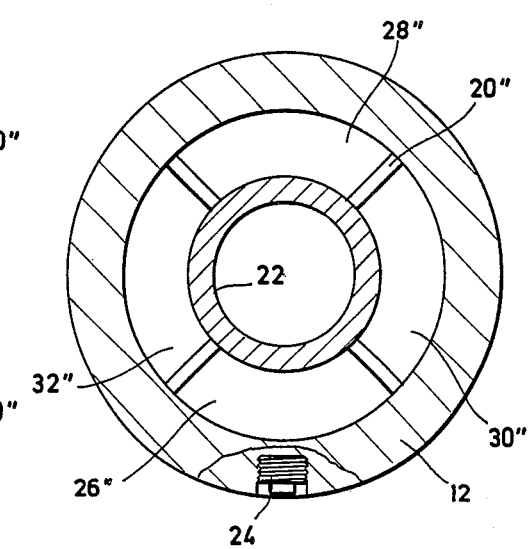
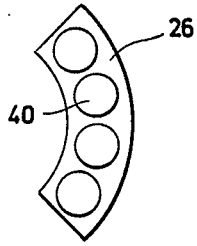
FIG. 6
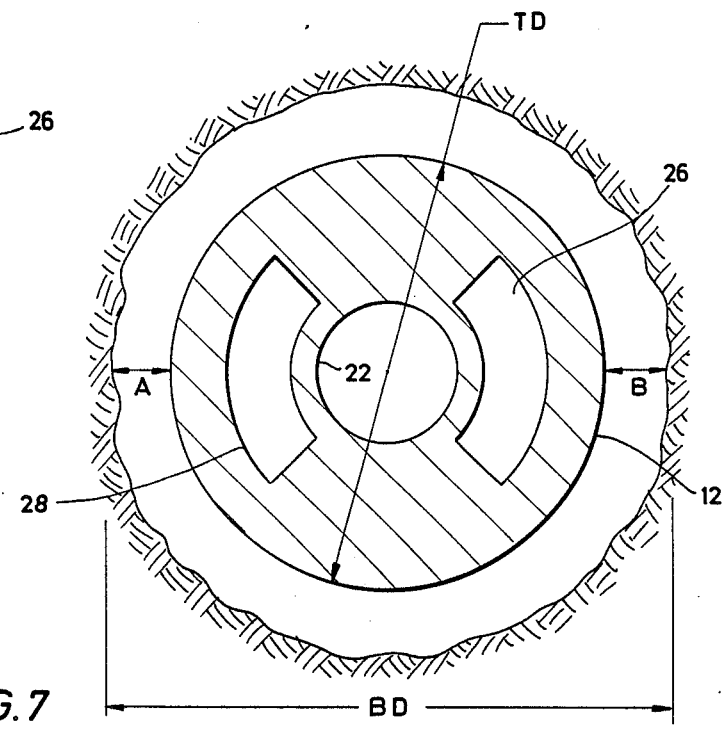
FIG. 7

DETERMINATION OF THE "k" CONSTANT FROM THE STANDOFF MEASUREMENTS

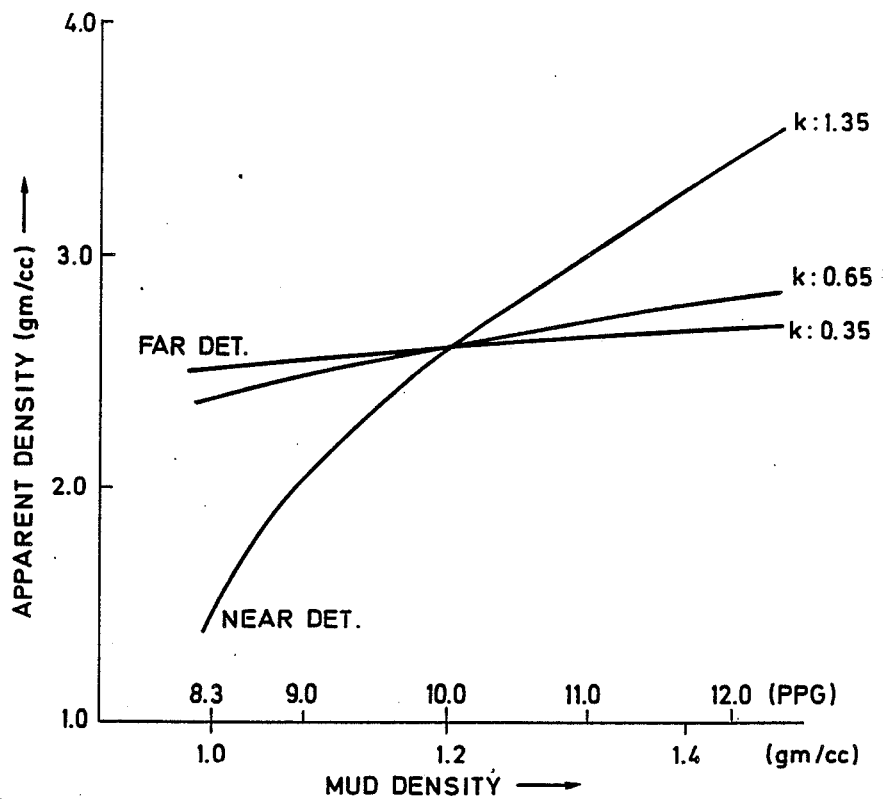
FIG. 10 MUD DENSITY SENSITIVITY (9" BOREHOLE 2.6 gm/cc FORM. DENSITY)
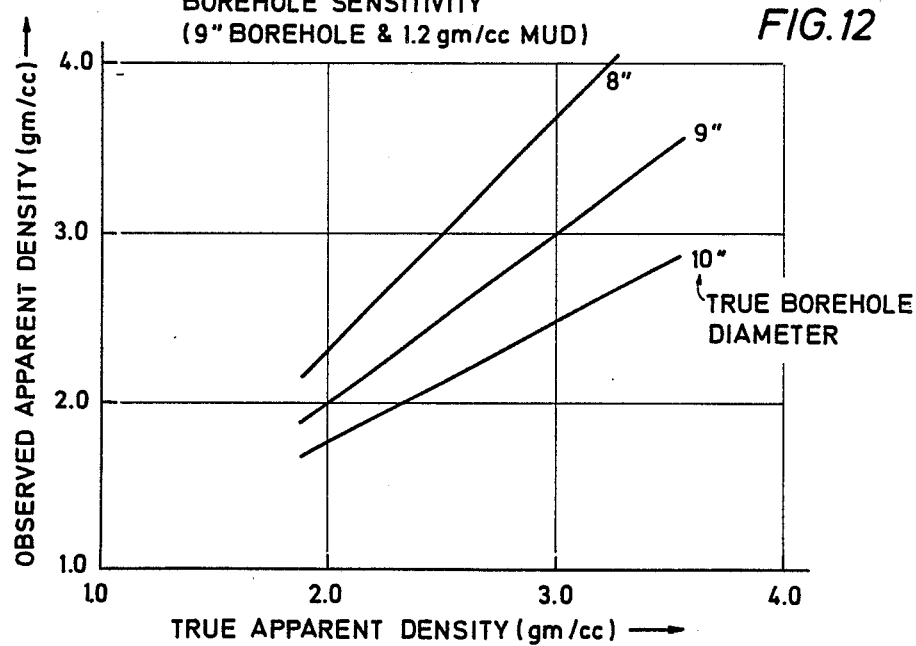
FIG. 12 BOREHOLE SENSITIVITY (9" BOREHOLE & 1.2 gm/cc MUD)

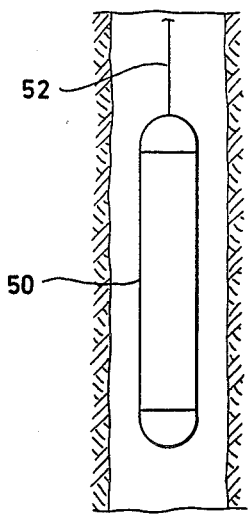
FIG. 13
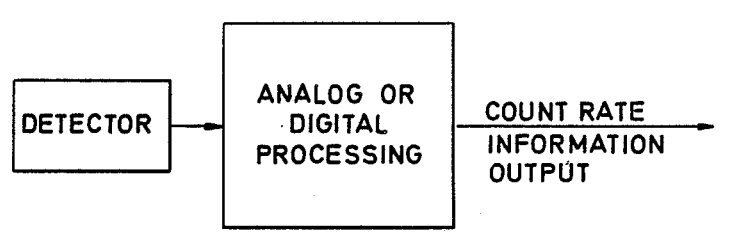
(a)
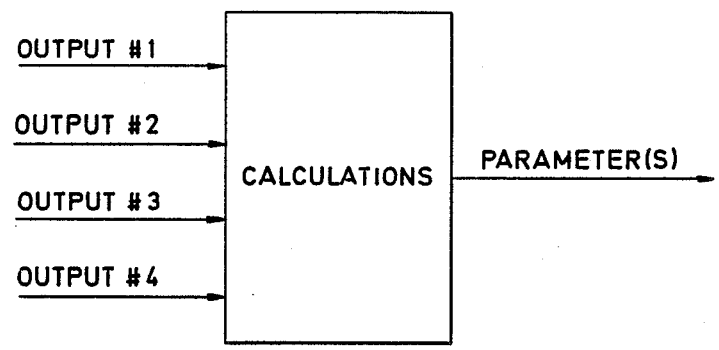
(b)
FIG. 14

LOGGING APPARATUS AND METHOD

Cross-Reference to Related Application

This is a continuation-in-part of co-pending U.S. patent application Ser. No. 872,949 filed June 11, 1986, now Pat. No. 4,829,176.

BACKGROUND OF THE INVENTION

1. Field of the Invention

The present invention pertains to techniques for making measurements of subsurface conditions in and surrounding a borehole such as a well or the like. More particularly, the present invention relates to method and apparatus for logging a borehole traversing an earth formation to simultaneously determine two or more downhole parameters, such as a transverse dimension of the borehole, the density of the surrounding formation and the density of the borehole fluid, including drilling mud, and provides method and apparatus which can perform this logging generally while drilling the borehole through the formation.

2. Description of the Prior Art

When drilling a borehole in the earth in search of petroleum, it is necessary to obtain as much information as possible regarding the nature and structure of the formations through which the borehole is passing. This information is necessary to enable the drilling operator to determine the progress of the drilling operation and to control its direction so as to intercept the pay zone. In the past, most of the necessary measurements have been made by pre-boring geological surveying techniques and then by wireline logging of the borehole after it has been drilled. This approach has a number of obvious disadvantages including loss of drilling time, the expense and delay involved in tripping the drill string so as to enable the wireline to be lowered into the borehole and both the build up of a substantial mud cake lining the borehole and invasion of the formation by the drilling fluids during the time period between drilling and taking measurements. An improvement over these prior art techniques is the recently developing art of measuring-while-drilling in which many of the characteristics of the formation are determined substantially contemporaneously with the drilling of the borehole. Measuring-while-drilling logging either partly or totally eliminates the necessity of interrupting the drilling operation to remove the drill string from the hole in order to make the necessary measurements by wireline techniques.

In addition to the ability to log the characteristics of the formation through which the drill bit is passing, obtaining this information on a real time basis provides substantial safety advantages for the drilling operation. Change in the density of the drilling fluid or the density of the formation or diameter of the borehole, for instance, would indicate conditions which possibly would require immediate attention of the driller in order to prevent a possible blowout. The decrease in the density of the drilling fluid might indicate influx of gas into the borehole from the surrounding formation. It would therefore be necessary to take prompt corrective action in order to prevent a blowout, for example by changing the density of the drilling fluid. With the previous wireline techniques, tripping of the drill string under these conditions could greatly increase the chances of a blowout occurring.

As mentioned above, one of the more important pieces of information to ascertain downhole is the density of the formation through which the borehole is passing. A known technique incorporates the use of gamma ray density probes which are devices generally incorporating a gamma ray source and at least one gamma ray detector which is shielded from the source and which during operation of the probe counts the photons emanating from the source and interacting with the electrons of the material of the formation primarily by Compton scattering. The percentage of photons emitted from the source which eventually pass to the detector after having undergone Compton scattering through the formation depends upon the density of the formation. The photons reaching the detector are counted by standard associated signal processing and data counting equipment.

One of the major difficulties encountered by the previously known density measuring devices is the requirement that the logging device physically contact the formation at the borehole wall. This requirement was necessitated by the fact that all of the known devices were wireline devices and were employed hours or even days after drilling. During this delay, the drilling fluids can both invade the formation and build up a coating of substantial thickness on the borehole wall, either one of which would directly affect the accuracy of measurements taken. It would not be possible to trip a drill string and lower a wireline device fast enough to avoid invasion and/or mud cake problems. These problems are not as severe in a measuring-while-drilling situation since there most likely is no significant amount of mud cake deposited on the borehole walls in a drilling situation, and measurements would generally be taken within an hour of drilling through a location to be measured. Some of the attempts to compensate for the mud cake problem in wireline measurements have included the use of two different detectors spaced axially along a deployable pad which is pressed into and plows through part of the mud cake. The near detector receiving radiation which is scattered partially from the mud cake provides a mud cake correction to the further spaced detector receiving radiation which has scattered principally from the formation. Such multiple detectors are usually used in combination with a complex collimation scheme to narrowly define the emitted beam and direct it into a specific region of the formation and to receive, at a particular detector, only radiation coming from a particular region of the formation.

An example of a prior art wireline density probe which is claimed to function regardless of the thickness and the chemical composition of the materials that are located between the density probe and the samples is discussed in U.S. Pat. No. 3,846,631. The disclosed technique comprises passing two gamma ray beams from two intermittently operated sources into the formation, receiving the radiation back scattered from each of the two sources by two separate detectors, and building ratios of products of the four separate counting rates in such a manner that the numerical result is an indication of the density of the formation. The two-detector probes must be deployed against the borehole wall, as previously discussed, and the spacing between the detectors is a critical dimension. Any non-uniformity of the formation materials or the borehole wall between the detectors will cause an erroneous result.

There are currently no known patented gamma radiation density detecting devices which operate in a measuring-while-drilling condition.

Prior art calipers are usually mechanical devices which require physical contact with the borehole walls. This requirement is very difficult to meet while drilling without affecting the steering of the bottom hole assembly. Acoustical calipers would be equally difficult to use during drilling due to the noise caused by the drilling itself.

It would be very advantageous to overcome the limitations and inaccuracies of the prior art by having a system including a method and apparatus for measuring the density of formations while drilling a borehole through the formations without the necessity of defining narrow bands of the formation, performing collimation of the radiation, or physically contacting the borehole walls.

The instant invention will obviate the need for additional caliper measuring devices, or assumptions regarding the borehole dimensions, or assumptions regarding the composition of the formation being logged, or information on the formation derived from secondary sources, or assumptions concerning the fluids in the borehole at the time of the measurement.

SUMMARY OF THE INVENTION

The present invention provides measuring apparatus for use in determining downhole parameters associated with a borehole, including a generally elongate housing carrying a source of gamma radiation and at least two pairs of radiation detectors. Each pair of detectors is positioned with the detectors diametrically opposite each other on opposite sides of the longitudinal axis of the housing. The geometric configuration of the combination of the first detector pair with the radiation source is different from the geometric configuration of the combination of the second pair and the radiation source. The radiation source and the detectors are positioned so that radiation from the source may be emitted into the borehole and surrounding formation, and scattered radiation may be detected by the detectors. The detectors produce output signals which may be processed to provide data signals indicative of the radiation detected by each of the detectors. Using such data signals, two or more downhole parameters indicative of the borehole and/or its surroundings may be determined. Additional pairs of detectors, diametrically opposed across the longitudinal axis as described above and in unique configurations with the radiation source, may be employed whereby additional downhole parameters may be simultaneously determined.

The housing carrying the radiation source and detectors may be positioned in the borehole by means of a wireline or other flexible line extending to the surface, or may be included in a pipe string used in drilling, for example. In the latter case, the apparatus may be operated in the measuring-while-drilling mode, that is, the detectors may sense the scattered radiation while the pipe string is stationary during an interruption in the drilling, or while the pipe string is being rotated, even while drilling is taking place. Similarly, the housing depending from the wireline may be intentionally rotated, or not, during data taking procedures.

The detectors may be calibrated on the tool utilizing formations of known bulk densities, even including liquids as calibration formations.

According to the present invention, a borehole may thus be logged to simultaneously obtain radiation count data for use in determining two or more parameters indicative of the downhole environment. Such parameters may include the density of the borehole fluid, the bulk density of the formation at the level of the housing where data is acquired, or a transverse dimension of the borehole at such level.

BRIEF DESCRIPTION OF THE DRAWINGS

FIG. 4 is a partial perspective schematic illustration of a portion of the instrument package inset of another embodiment of the present invention, showing staggered axial placement of detectors;

FIG. 5 is a generally schematic transverse section similar to FIGS. 2 and 3, but showing the circumferential placement of the detectors of the embodiment shown in Fig. 4;

FIG. 6 is an end view of a detector, illustrating how such a detector may include a bank of individual sensing devices;

FIG. 7 is a generally schematic transverse section of a drill string, including the present invention, positioned in a borehole taken along line 7—7 of FIG. 1, showing standoff distances A and B, the tool diameter TD, and the borehole diameter BD;

FIG. 10 is a graphical representation of the dependence of the apparent formation density on the geometric constant as a function of the borehole fluid density;

FIG. 12 is a graphical representation showing the correction between the apparent formation density observed and the true formation density, as a function of the borehole diameter;

DESCRIPTION OF THE PREFERRED EMBODIMENTS

Figure 1:
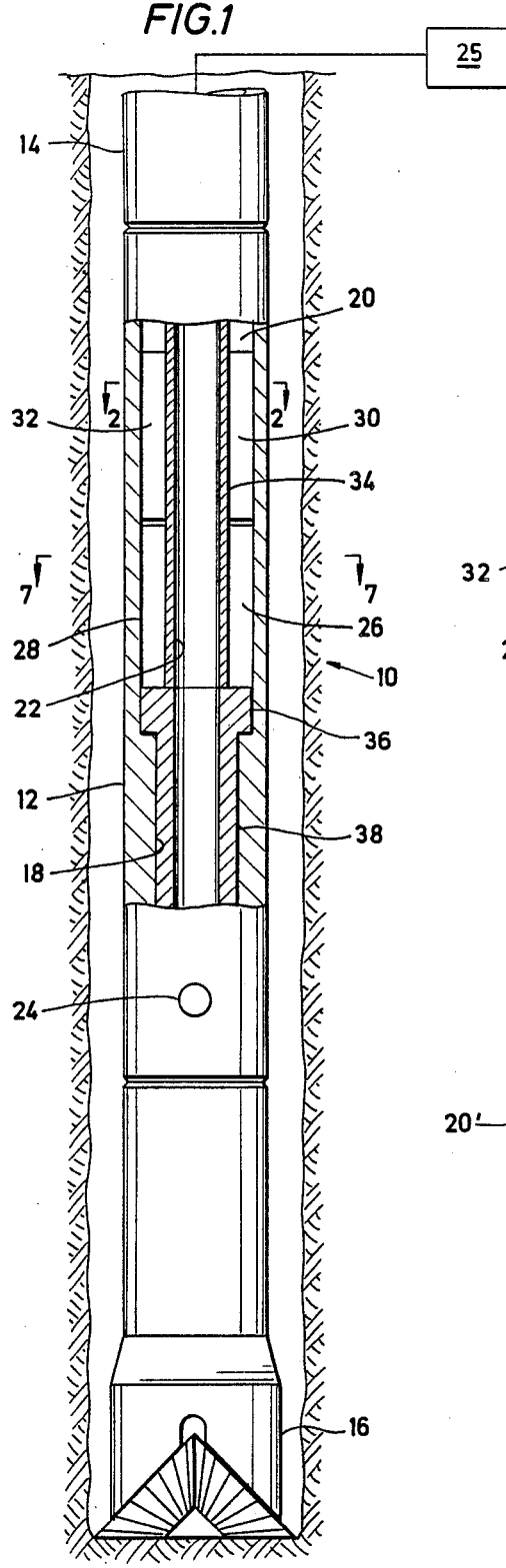
FIG. 1 is a generally schematic side elevation, partly in section, of the lower end of a drill string including a downhole sub incorporating one embodiment of the present invention.

Measuring apparatus according to the present invention is shown generally at 10 in FIG. 1 housed in a sub 12 included within a drill string 14 a short distance above the drill bit 16 in a borehole. The sub 12 may be provided by a modified drill collar having an internal throughbore 18 sufficiently broad to receive an instrument package insert 20 and still provide an elongate throughbore 22 which may align with the internal bore of other drill string components and effectively provide an uninterrupted flow passage for drilling fluid from the surface down to the drill bit 16. The sub 12 is further modified to include at least one gamma radiation source 24 comprising a threaded insert received within a threaded opening in the side wall of the sub. Such a source 24 of gamma radiation may be any conventional well logging source, such as cesium-137.

The measuring system 10 is constructed to generate a series of signals for telemetry to the surface, either by electrical communication or mud pulsing, or recording on a downhole recording system for retrieval upon withdrawal of the apparatus from the well bore. As discussed more fully hereinbelow, detectors are included whereby radiation may be sensed and the radiation counts provided in the form of electrical signals indicative of the environment surrounding the measuring apparatus 10. The measuring system 10 measures averages of quantities that affect the scattering of gamma radiation, and thus measures parameters that affect the average density surrounding the measuring system. For example, the signals may include information concerning the formation density of the earth formation adjacent to the borehole, the average borehole diameter and the density of the fluid, generally drilling mud, located in the annular region within the borehole and surrounding the sub 12. The signal processing, telemetry and recording systems indicated generally at 25, that may be included as part of or ancillary to the measuring apparatus 10 may be of conventional design, and are therefore not described in detail.

The measuring apparatus 10 includes within the instrument package insert 20 two pairs of detectors, although additional detector pairs may be included. In each instance, each set, or pair, of detectors features the two detectors positioned mutually diametrically opposed across the longitudinal axis of the sub 12 and the instrument package insert 20. For example, in the embodiment illustrated in FIGS. 1 and 2, two detectors 26 and 28 are disposed to the right and left of the central longitudinal axis of the sub 12 as viewed, and directly thereabove is a second pair of detectors 30 and 32 similarly situated to the right and left of the sub longitudinal axis, respectively, so that detector 30 is directly above detector 26 and detector 32 is directly above detector 28. It will be appreciated that the right side detectors 26 and 30 are centered circumferentially at an azimuthal angle of 90° from the circumferential position of the gamma radiation source 24, and that the left side detectors 28 and 32 are each similarly positioned circumferentially at an azimuthal angle of 90° from the circumferential location of the source, but in the opposite sense from the right side detectors. Consequently, the right side detectors 26 and 30 and the left side detectors 28 and 32 are symmetrically disposed relative to the gamma radiation source 24. However, the upper detectors 30 an 32 are axially displaced farther from the source 24 than the lower detectors 26 and 28, and therefore are, in general, farther from the source.

Figure 3:
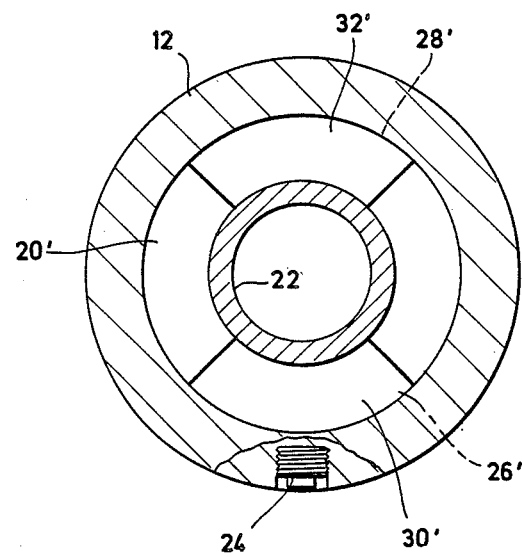
FIG. 3 is a generally schematic transverse section similar to FIG. 2, but showing details of another embodiment of the present invention.

Another arrangement of two pairs of detectors according to the present invention is illustrated in FIG. 3 wherein a first pair of detectors 26' and 28' is provided with the detectors again positioned diametrically on opposite sides of the longitudinal axis of the sub 12, and a second pair of mutually diametrically opposed detectors 30' and 32' is provided with the detectors positioned directly above the lower detectors 26' and 28', respectively. In this case, however, while again the upper detectors 30' and 32' are axially displaced farther from the source 24 of gamma radiation than the lower detectors 26' and 28', neither of the pairs of detectors is positioned symmetrically relative to the source. One detector of each of the pairs of detectors, namely the detectors 26' and 30', is centered aligned circumferentially above the source, and the other detector of each of the pair of detectors, namely detectors 28' and 32', is centered circumferentially at an azimuthal angle of 180° from the source. Consequently, each of the pairs of detectors is oriented asymmetrically relative to the radiation source 24.

Another arrangement of two pairs of diametrically opposed detectors is illustrated in FIGS. 4 and 5 wherein it may be seen that a first pair of detectors 26" and 28" is arranged in the instrument package insert 20" asymmetrically relative to the gamma radiation source 24 with the detector 26" centered circumferentially above the source and the detector 28" centered 180° circumferentially relative to the source. The second pair of detectors is arranged symmetrically relative to the source 24, with one detector 30" centered 90° circumferentially to the right of the source as illustrated, and the second detector 32' centered 90° circumferentially to the left of the source. However, as indicated in FIG. 4, the symmetrically positioned detectors 30" and 32" are axially displaced farther from the axial level of the radiation source 24 than are the asymmetrically arranged detectors 26" and 28". The relative difference in axial displacement of the asymmetrically positioned detectors 26" and 28" compared to that of the symmetrically positioned detectors 30" and 32" need only be a few centimeters, but could be as large as tens of centimeters. Further, in yet another array of detectors, the difference in axial displacement of the four detectors 26"–32" may be zero.

It will be appreciated that still another formation of the two pairs of detectors may be achieved by rotating the position of the source 24 in the embodiment of FIGS. 4 and 5 90° to the right or left so that the radiation source is circumferentially aligned with one or the other of the detectors 30" and 32" are axially displaced farther from the radiation source than are the remaining two detectors 26" and 28".

In each case, appropriate material for shielding the detectors against direct radiation from the gamma ray source 24 may be utilized. For example, as shown in FIG. 1, a generally cylindrical shielding construction 34 may be positioned within the array of detectors, and an annular shielding ring may underlie the detectors with a further cylindrical shielding shaft 38 extending downwardly and even radially within the position of the source 24 to minimize the detection of gamma radiation from the source directly to the detectors by "streaming" of the radiation axially along and through the sub 12 and the bore 22. The material used to provide the shielding 34–38 may be any appropriate gamma radiation shielding material, such as tungsten.

Each of the detectors discussed herein is illustrated schematically, or in block form, being shown generally as an arcuate oblong object. It will be appreciated that any appropriate gamma radiation detector may be utilized, and in each case the detector may comprise any number of gamma radiation sensors appropriately connected to provide a single output signal indicative of the radiation detected by the total array of sensors. Typical conventional gamma radiation sensors which may be utilized include Geiger Mueller tubes, scintillators such as sodium iodide detectors, or solid state sensors such as of the germanium family of detectors. FIG. 6 illustrates how the detector 26, as an example, may include a cluster of generally cylindrically shaped Geiger-Mueller tubes 40, positioned within the region designated by the schematic shape otherwise used to indicate the detector 26.

Each of the pairs of detectors in any of the detector arrangements discussed herein includes two detectors that are positioned symmetrically relative to each other about the longitudinal axis of the sub 12 at equal azimuthal angles of separation from one another, that is, 180° on diametrically opposite sides of the sub. The output signals generated by the sensing devices of each of the two detectors in such a pair are electronically processed to produce data signals proportional to the count rates of the detector sensors and which carry information about the environment in which the sub is located. This geometry of detectors so disposed may provide accurate measurements of the sub surroundings even with the sub 12 eccentered within the borehole because the distances between the eccentered sub and the borehole wall may be compensated for mathematically, at least in some cases. Alternatively, the measuring apparatus may be rotated while radiation is detected so that each data signal is proportional to the average readings of radiation detected by the respective detector sweeping in a 360° circle around the borehole, and therefore carries information of the average values of the borehole parameters for the environment surrounding the sub 12.

Figure 2:
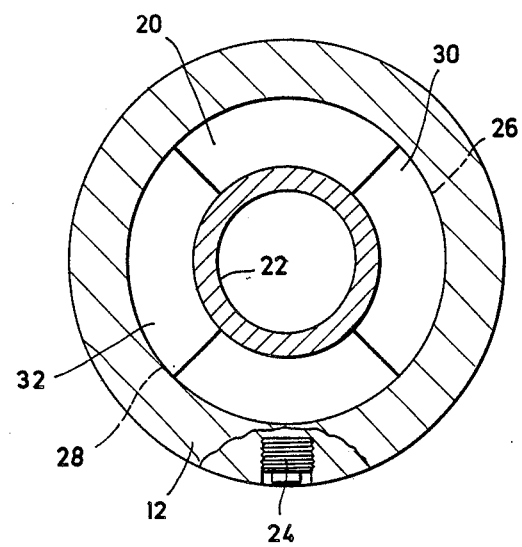
FIG. 2 is an enlarged, generally schematic transverse section, taking along line 2—2 of FIG. 1 and partly broken away to show relative placement of radiation detectors and a radiation source.

As an example, the formation density could be obtained utilizing a pair of opposed detectors, such as the lower detectors 26 and 28 in the embodiment of FIGS. 1 and 2. If two pairs of detectors are used, two parameters may be independently determined, such as formation density and the diameter of the borehole. If three pairs of detectors are utilized, three logging parameters may be determined, such as formation density, borehole diameter and drilling fluid density. For each additional pair of opposed detectors added, an additional parameter of the sub environment may be determined.

In practice, whether in a measurement-while-drilling operation or with the measuring apparatus in a sonde 50, as shown in FIG. 13, suspended by a wireline or other flexible line for example, at any given depth in the borehole the electronics operating the detectors may be turned on and radiation counts obtained. Gamma radiation from the source 24 interacts with the drilling fluid in the borehole surrounding the sub 12, and with the formation in the vicinity of the borehole at the level of the sub 12. In the latter case, the radiation interactions occur not only with the solid structure of the formation but with the fluid present in the interstitial spaces within the formation. The interaction of interest is Compton scattering, and the detectors may be so adjusted to detect gamma radiation in a range from 100 kev to approximately 600 kev (in the case of a cesium-137 source) to ensure that nearly all of the detected radiation that reaches the detectors is due to the emitted radiation interacting with the environment of the sub by Compton scattering.

It will be appreciated that the radiation emission pattern from the source 24 will be affected by the presence of the sub 12 so that more radiation reaches the formation adjacent the source 24 than is available at the formation on the opposite side of the sub from the source. Consequently, with an asymmetric detector arrangement, such as illustrated in FIG. 3, and FIGS. 4 and 5 in the case of the detectors 26″ and 28″, the detectors on the same side of the sub 12 as the source 24 will detect more scattered gamma photons than those on the opposite side of the sub. Further, in the case of detectors positioned one above the other, as shown in FIGS. 1–3, a detector that is positioned axially displaced relatively far from the axial position of the source 24 will generally detect radiation scattered from a greater depth within the surrounding formation than will a detector that is positioned closer axially to the level of the source. This is a well known phenomenon, and is due to the fact that radiation penetrating to greater depths in the surrounding formation will generally scatter to greater axial distances from the source. In addition to the foregoing considerations of the geometry of the positions of the detectors relative to the source affecting the radiation sensed by the detectors, the radiation reaching the detectors may also be affected by the position of the sub 12 in the borehole.

Mathematical expressions can be obtained relating the density of the formation in the vicinity of the sub 12, the density of the fluid within the borehole surrounding the sub and the dimensions of the borehole, which expressions can be utilized with the radiation count data obtained by the detectors to provide values for these physical quantities. As an example, the case of right and left side detectors 26 and 28, respectively, of the array of FIGS. 1 and 2 may be considered in relation to FIG. 7 which shows the sub 12 at a level in the borehole wherein the left standoff distance from the sub's outer surface to the borehole wall adjacent the left detector 28 is A, and the right standoff distance from the sub's outer surface to the borehole wall adjacent the right side detector 26 is B. With the outer diameter of the tool, or sub 12, being TD, the width of the borehole at the right and left detectors 26 and 28, respectively, is then the sum of TD plus A and B, which is denoted BD. In a borehole of circular cross section, BD is the borehole diameter or a chord. If measurements are taken while the sub 12 is being rotated about its longitudinal axis, the average borehole transverse dimension may be obtained as BD for any shape borehole cross section and with the sub generally at any lateral configuration within the borehole.

Each of the detectors in general converts the detection of radiation events into an output voltage or current pulse signal. The pulse rate is proportional to the radiation flux at the detector, that is, the number of photons incident on the detector per unit time. As indicated in FIG. 14(a), the output signal from each detector may be appropriately processed using conventional methods to provide an analog voltage data signal proportional to the radiation count rate sensed by the detector, or a digital signal which gives the count rate. In either case, the data signal can be related to the density of the environment scattering radiation from the source 24 to the detector in question. Thus, for example, the density measured by the left side detector in FIG. 7, $\rho_l$, is given by the expression:

$$\rho_l = [(1-\phi)\rho_m + \phi\rho_f](1-\alpha) + \alpha\rho_b \qquad (1),$$

where:

$\rho_m$ = formation matrix density;
$\phi$ = porosity of the formation;
$\rho_f$ = density of the fluid in the formation;
$\rho_b$ = density of the fluid (drilling mud) in the borehole; and
$\alpha$ = fraction of the gamma radiation which interacts in the borehole fluid.

The formation porosity $\phi$ may be defined in terms of the apparent formation density, or bulk density, of the formation, $\rho'$, as follows:

$$\phi = (\rho' - \rho_m)/(\rho_f - \rho_m) \quad (2),$$

which can be rewritten as:

$$\rho' = (1-\phi)\rho_m + \phi\rho_f \quad (3).$$

Thus, Equation 1 may be rewritten as:

$$\rho_l = \rho'(1-\alpha) + \alpha\rho_b \quad (4).$$

The formation includes the solid matrix as well as the fluids interspersed in the interstitial spaces of the matrix. Thus, the density of the entire formation, including that of the solid matrix as well as the fluid, is the apparent formation density, or the bulk density. The density of only the solid portion of the formation is the formation matrix density, as opposed to the density of the fluid only in the formation.

Similarly, the density measured by the right side detector in FIG. 7 may be expressed as:

$$\rho_r = \rho'(1-\beta) + \beta\rho_b \quad (5),$$

where $\beta$ is the fraction of the gamma radiation interacting in the drilling fluid on the right side of the sub.

Equations 1, 4 and 5 are equally valid for wireline applications as well as measurement-while-drilling applications. As noted hereinabove, the geometry of the position of the two detectors carried by the tool and located in the borehole is constrained to first order by the aforementioned definition for BD. The probability of a photon traveling a distance A before colliding is represented by $e^{-k_1 A}$. The probability, then, of such a collision occurring at a distance less than A is defined as $[1 - e^{-k_1 A}]$. Similarly, the probability of a photon undergoing a collision within the distance B is given by $[1 - e^{-k_2 B}]$. The constants $k_1$ and $k_2$ are geometric constants related to the right and left side detectors, respectively, and are discussed further hereinbelow. For the specified geometry, the constants $\alpha$ and $\beta$ may be written as follows:

$$\alpha = 1 - e^{-k_1 A} \quad (6),$$

and $$\beta = 1 - e^{-k_2 B} \quad (7).$$

Thus, $\alpha$ and $\beta$ are probabilities that the photons will interact in the borehole fluid, and $(1-\alpha)$ and $(1-\beta)$ are the probabilities that the photons will interact in the formation and not within the borehole.

Combining Equations 4 and 6 yields:

$$\rho_l = \rho_b + (\rho' - \rho_b) e^{-k_1 A} \quad (8).$$

The left side standoff A may be expressed as:

$$A = BD - TD - B = k - B \quad (9)$$

where k is the sum of the diagonally opposed standoffs A and B, or, with the outer diameter of the sub known, is a measure of the transverse borehole dimension along the line passing through the centers of the left side and right side detectors. Equation 8 can then be expressed in terms of the right side standoff, B, as:

$$\rho_l = \rho_b + (\rho' - \rho_b) e^{-k_1(k-B)} \quad (10).$$

Solving Equations 5 and 7 for the exponential term in the standoff B yields:

$$e^{-k_2 B} = (\rho_r - \rho_b)/(\rho' - \rho_b) \quad (11),$$

or $$e^{-k_1 B} = [(\rho_r - \rho_b)/(\rho' - \rho_b)]^{k_1/k_2} \quad (12).$$

Combining Equations 10 and 12 provides an expression in terms of the measured densities which does not depend on the standoff distances A and B:

$$\rho_l = \rho_b + (\rho' - \rho_b) e^{-k_1 k} [(\rho' - \rho_b)/(\rho_r - \rho_b)]^{k_1/k_2} \quad (13).$$

Equation 13 can be solved for the apparent, or bulk, formation density:

$$\rho' = \rho_b + [(\rho_l - \rho_b)^{k_2}(\rho_r - \rho_b)^{k_1} e^{k_1 k_2 k}]^{1/(k_1 30\ k_2)} \quad (14).$$

Equations 13 and 14 are independent of the tool's position in the borehole.

If, for a given pair of detectors, the constants $k_1$ and $k_2$ are equal to a constant $k_{12}$, Equation 14 reduces to $$\rho' = \rho_b + ](\rho_l - \rho_b)(\rho_r - \rho_b) e^{ksi\ 12k}]^{\frac{1}{2}} \quad (15).$$

This will be the case for two detectors symmetrically disposed relative to the radiation source, such as detector pairs 26 and 28, or 30 and 32, or 30" and 32", but not for detector pairs 26' and 28', or 30' and 32', or 26" and 28", which are asymmetric relative to the source.

Assuming that constant $k_{12}$ may be known, and since $\rho_l$ and $\rho_r$ are measured using the two detectors in question, Equation 15 includes three quantities which may be unknown: k, which depends on the transverse dimension of the borehole, $\rho_b$, which is the density of the fluid in the borehole, and $\rho'$, the apparent formation, or bulk, density. If the borehole diameter is known and the drilling fluid density is known, Equation 15 may be utilized to determine the bulk density of the formation.

If a second pair of opposed detectors, symmetric relative to the radiation source, is used, and the geometry of the second detectors relative to the radiation source is different so that the radiation measurements taken by the two sets of detectors are not redundant, two independent measurements may be used to determine two of the three unknown parameters present in Equation 15. By providing a third pair of mutually opposed detectors, symmetric relative to the source and with geometry different still from either of the two previous sets of detectors, all three unknown parameters of Equation 15 may be determined unambiguously. For example, Equation 15 may be written for any two detectors positioned mutually opposite each other across the longitudinal axis of the sub 12 and symmetrically with respect to the radiation source. Utilizing the two pairs of detectors arranged as shown in FIG. 2, for example, the following two equations result, wherein the subscripts 26, 28 30 and 32 are used to identify the density measurements made by the respective detectors and the constant $k_{12}$ is characteristic of each of the detectors 26 and 28, and similarly the constant $k_{34}$ is characteristic of each of the detectors 30 and 32:

$$\rho' = \rho_b + ](\rho_{28} - \rho_b)(\rho_{26} - \rho_b)e^{k_{12}k}]^{\frac{1}{2}} \quad (16)$$

and $$\rho^1 = \rho_b + [(\rho_{32} - \rho_b)\rho_{30} - \rho_b)e^{k_{34}k}]^{1/8} \quad (17).$$

In general, the value of k will be the same for all detector pairs if the tool is rotating during measuring of the scattered radiation, or if the tool is centered in a borehole of circular cross section. In the special case of the pairs of detectors being stacked as in FIGS. 1 and 2, the value of k may also be the safe for all detector pairs if the transverse dimension of the borehole through the detector pairs is constant Otherwise, a different value for k would be considered for each equation of the form of Equation 14 or 15, for example.

As indicated in FIG. 14(b), processed output signals form the detectors may be combined according to Equations 16 and 17 which may be simultaneously solved for two of the three unknown parameters contained therein, again assuming that the constant $k_{34}$ may be determined. The addition of a third pair of diametrically opposed detectors, symmetric relative to the radiation source but with geometry relative to the radiation source 24 differing from the geometry of either of the other two pairs of detectors, provides yet a third equation similar to Equations 16 and 17 so that such three equations may be simultaneously solved for three unknown parameters characteristic of the environment in which the sub containing the measuring apparatus in located.

As noted hereinbefore, each detector 26-32 may comprise an array of individual sensors whose output signals may be combined to provide a single output signal form the respective detector taken as a whole. Similarly, the output signals from two detectors may be combined to provide a single output signal, treating the two detectors as one detector. For example, the two right side detectors 26 and 30 illustrated in FIG. 1 may have their output signals combined to provide a single output signal which, after appropriate signal processing, results in a data signal from which may be obtained the number of counts per unit time of photons sensed by the sensors of detectors 26 and 30, so that these two detectors function essentially as a single detector on the right side of the sub 12. In a similar fashion, the two left side detectors 28 and 32 may be operated as a single detector. In each case, the resulting combined detectors are effectively centered longitudinally at a point between the two detectors so combined, so that the center of the right side detector appears midway between detectors 26 and 30 and the center of the left side detector appears midway between detectors 28 and 32.

The resulting combined right side and left side detectors form a pair of detectors which are disposed symmetrically relative to the longitudinal axis of the sub 12 and in a unique geometric configuration with the radiation source, that is, they form a diametrically opposed pair of detectors with their own geometric constant, $k_{56}$. With the combined right side and left side detectors centered at a different axial displacement relative to the radiation source 24 compared to the axial displacement of the centers of the two original pairs of detectors 26, 28 and 30, 32, the pattern of scattered radiation sensed by the right side and left side detectors may be expected to be different from that sensed by either of the original two pairs of detectors, and the geometric constant $k_{56}$ of each of the right side and left side detectors is different from $k_{12}$ and from $k_{34}$. A density measurement equation, similar to Equations 16 and 17, may be written for use with the output signals of the combined right side and left side detectors thus described, where the total density signal for the right side detector is $\rho_{26+30}$ and that for the left side detector is $\rho_{28+32}$:

$$\rho' = \rho_b[(\rho_{28+32} - \rho_b)(\rho_{26+30} - \rho_b)e^{k_{56}k}]^{\frac{1}{2}} \quad (18);$$

assuming the same value for k as in the case of Equations 16 and 17. Equations 16, 17 and 18 are mutually independent and may be simultaneously solved for the three unknown parameters of the environment surrounding the sub 12.

In cases of opposed detectors which are not positioned symmetrically relative to the radiation source, Equation 14 may be utilized. For example, in using the detector array shown in FIG. 3, Equation 14 may be applied to the lower front and rear detectors 26' and 28', respectively. The same form of equation may be separately applied to the upper front and rear detectors 30' and 32', respectively, and again to an opposed pair of detectors formed by combining the signals from the two front detectors 26' and 30' for one detector, and by combining the signals from the two rear detectors 28' and 32' for the second detector. The result equations, with subscripts relating to the specified detectors, are:

$$\rho' = \rho_b + [(\rho_{28'} - \rho_b)^{k_{26'}}(\rho_{26'} - \rho_b)^{k_{28'}} e^{k_{26'}k_{28'}k}]/(k_{26'} + k_{28'}) \quad (19),$$

$$\rho' = \rho_b + [(\rho_{32'} - \rho_b)^{k_{30'}}(\rho_{30'} - \rho_b)^{k_{32'}} e^{k_{30'}k_{32'}k}]1/(k_{30'} + k_{32'}) \quad (20),$$

and $$\rho' = \rho_b + [(\rho_{28'+=32'}' - \rho_b)^{k_{26'}+30'}(\rho_{26'+30'} - \rho_b)^{k_{28'}+-}$$
$$e^{k_{26'}+30'k_{28'}+32'k}]1/(k_{26'+30}+k_{28'+32'}) \quad (21),$$

again assuming k is the same for all detector pairs.

It will be appreciated that each of the six detectors thus provided by the array of FIG. 3 is situated uniquely relative to the radiation source 24, and therefore has a unique geometric constant. Therefore, each of the three pairs of detectors thus formed features its own geometry relative to the radiation source 24, and, therefore, the three resulting Equations 19–21 are mutually independent and may be solved simultaneously for three unknown parameters reflecting the environment surrounding the sub 12.

Likewise, the output signals from the four detectors of the array illustrated in FIGS. 4 and 5 may be expressed in he form of Equation 14 to obtain the three unknown parameters reflecting the environment surrounding the sub 12. Thus, Equation 14 may be applied to the pair of lower front and rear detectors 26" and 28", and either Equation 14 or Equation 15 may be applied to the upper right and left detectors 30" and 32" (since these detectors are symmetric relative to the radiation source and have the same geometric constant), and Equation 14 may again be applied to the pair of detectors obtained by combining the output signals from detectors 26" and 30" to form one detector, and combining the output signals from the detectors 28" and 32" to form the second detector. The resulting equations are $$\rho' = \rho_b + [(\rho_{28''} - \rho_b)^{k_{26''}}(\rho_{26''} - \rho_b)^{k_{28''}} e^{k_{26''}k_{28''}k_xl/(k_{26''}+k_{28''})} \quad (22),$$

$$\rho' = \rho_b + [(\rho_{32''} - \rho_b)(\rho_{30''} - \rho_b)e^{k_{30'',32''}k_y}]^{1/8} \quad (23),$$

and $$\rho' = \rho_b + [(\rho_{28''+32''} - \rho_b)^{k_{26''+30''}}(\rho_{26''+30''} - \rho_b)^{k_{29''+32''}}e^{k_{26''+30''}k_{28''+32''}k_z}]^{1/(k_{26''+30''}+k_{28''+32''})} \quad (24),$$

where $k_x$, $k_y$ and $k_z$ are employed as the transverse borehole dimension across the three pairs of detectors 26", 28"; 30", 32"; and 26"+30", 28"+32", respectively.

The detector combination 26" and 30" is symmetric with the detector combination 28" and 32" relative to the longitudinal axis of the sub 12. The three detector pairs thus formed are axially centered at different displacements relative to the axial height of the radiation source 24, and each of the three pairs of detectors comprises two detectors diametrically opposed relative to the longitudinal axis of the sub 12. Further, each such pair of detectors displays a different geometry relative to the position of the radiation source 24, and therefore the three Equations 22–24 may be simultaneously solved for three unknown parameters of the environment surrounding the sub 12, it being understood that $k_x$, $k_y$ and $k_z$ may constitute up to three unknown parameters.

It will be appreciated that other combinations of detectors may be formed utilizing two pairs of diametrically opposed single detectors. For example, the output signals of detectors 26" and 32" may be combined to effectively form one detector diametrically opposite a second detector formed by combining the output signals of the two detectors 28" and 30". Other detector arrays may be utilized. For example, detector pairs may be placed above and below the axial position of the radiation source. In various configurations of two pairs of diametrically opposed detectors, different combinations of detectors may be formed to provide data signals for use in three independent equations of the form of Equation 14 and/or 15 for simultaneous solution to obtain three unknown parameters of the environment of the measuring apparatus. Care must be taken in combining detectors to form a third pair, without the addition of more sensors, to avoid redundancies in the detector pairs. Such redundancies would be characterized by similar geometry relative to the radiation source for two or more selected detector pairs, and the corresponding two or more equations of the form of Equation 14 and/or 15 would not be mutually independent so that simultaneous solution of the equations would not provide unambiguous values for the parameters sought.

In practice, the density measurements can be made with the detectors while the measuring apparatus 10 is being rotated. Such rotation can be accomplished during normal drilling operations, with the sub 12 being rotated with the drill bit 16. Then, the count rate values obtained from processing the output signals produced by each of the detectors are average count rates of photons detected by detectors looking out from the tool over 360°. With the count rate data obtained during such rotation, the parameters reflecting the environment surrounding the sub 12, obtained by simultaneous solution of Equations 16–18, 19–21 or 22–24, for example, are also average values for the environment surrounding the sub. For example, the value $k = BD - TD$ yields the average value of the borehole transverse dimension less the tool diameter rather than just the sum of the standoff distances in one direction.

The geometric constants for the individual detectors may be determined utilizing calibrator pit calibrations, but unlike the case for ordinary wireline tool calibrations, the measuring apparatus 10 of the instant invention need not be held against the borehole wall during calibration. To calibrate the measuring apparatus, the tool may be maintained centered in a calibration pit of circular cross section utilizing centralizers, or the tool may be rotated while measurements are being made so that average values are once again obtained regardless of the pit transverse cross section or of the lateral position of the tool in the pit. For both downhole logging as well as calibration purposes, the rotation rate should be at least five rotations per measurement by the detectors.

Figure 8:
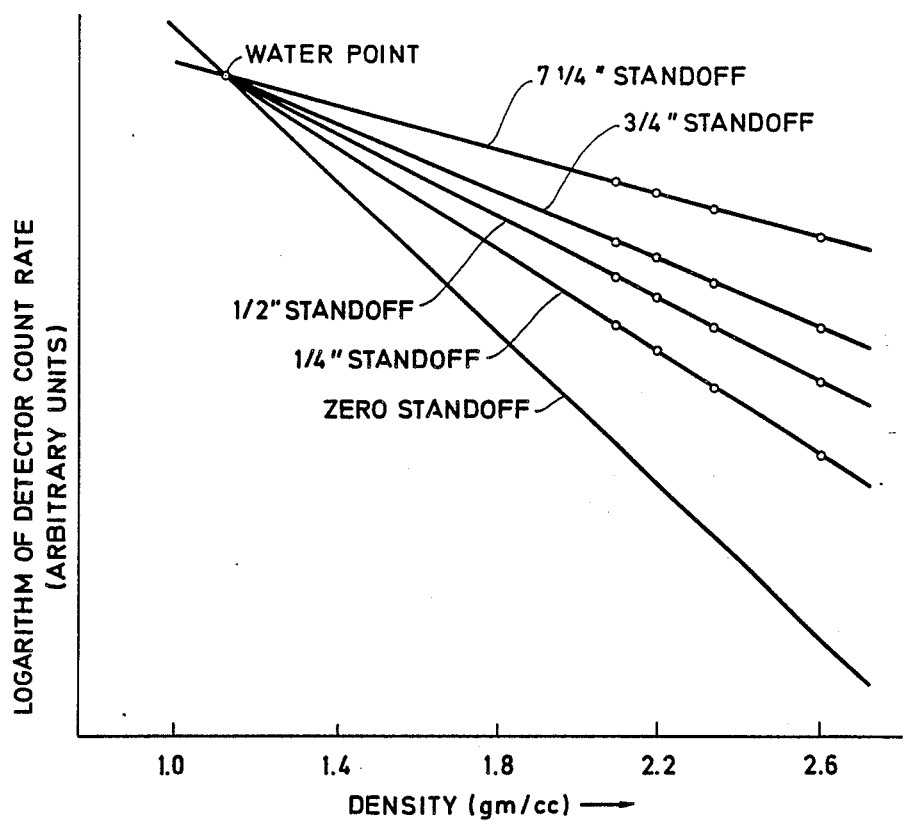
FIG. 8 is a graphical representation of typical calibration curves for detectors of the present invention.
Figure 9:
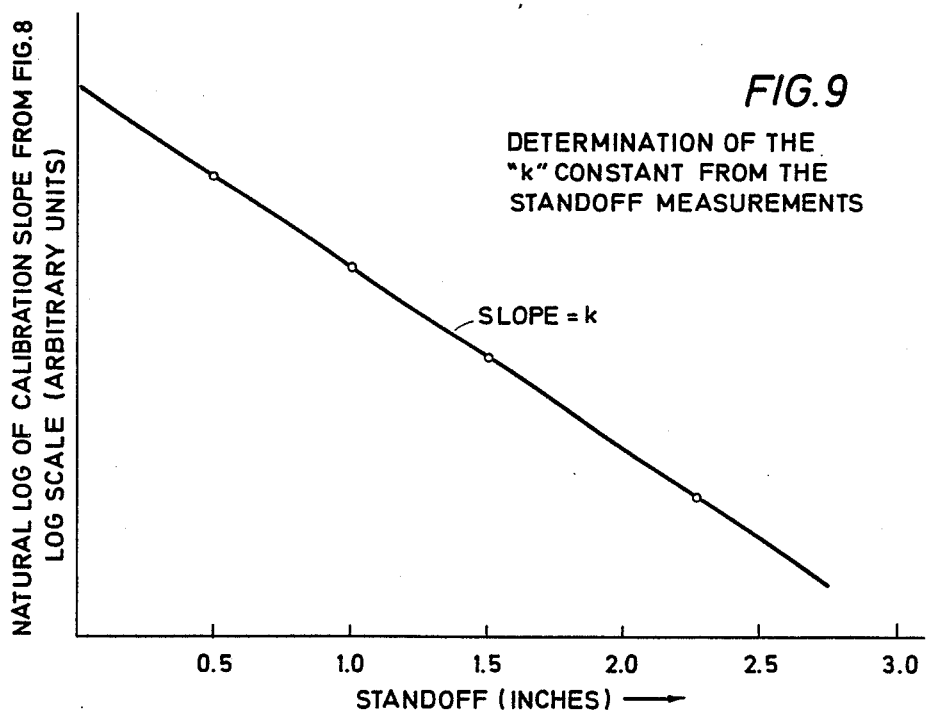
FIG. 9 is a plot of slopes of calibration curves of the type shown in FIG. 8, as a function of standoff measurements.

By knowing the borehole diameter, or average borehole transverse dimension, and the tool diameter, the average standoff of the measuring apparatus in the test pit is determined, and count rates are obtained for the particular detector being calibrated at several depths, with the formation bulk density being known at each depth. For a given such calibrator pit, the logarithm of the count rate obtained by the detector being calibrated is plotted as a function of the bulk density as shown in FIG. 8 (which illustrates representative curves). The detector may be thus calibrated in several pits of differing transverse borehole dimension, providing corresponding different actual non-zero standoffs. Thus, a family of curves as shown in FIG. 8 may be obtained for a given detector for different non-zero standoffs. The slope may be determined in normal fashion for each calibration curve in the family of curves of FIG. 8. The natural logarithms of the calibration curve slopes from FIG. 8 are plotted as functions of the standoff distances to obtain a straight line plot as shown in FIG. 9. From the discussion preceding Equations 6 and 7, it is clear that the slope of the straight line of FIG. 9 is equal to the geometric constant for the detector being calibrated. This geometric constant for the detector is fixed by the geometry of the measuring apparatus, that is, the configuration in the housing, or sub, of the combination of the detector and the radiation source, and needs to be determined only during the original tool design stages. If the type or placement of the detector is changed, the geometric constant will in general be different.

The ordinate intercept of the straight line of FIG. 9 is the slope of the calibration curve for the hypothetical case of zero standoff in FIG. 8. It will be appreciated that, while the zero standoff curve of FIG. 8 may be obtained as a by-product of the measurements used to obtain the geometric configuration constant, k, as described above, the curve may be obtained through direct measurements by immersing the tool in various fluids (of effective infinite extent) and known, differing densities since conformity of the fluid to the tool's surface is equivalent to zero standoff from a formation. Fluids with densities in the range of actual downhole formations may be utilized, in addition to water for example, to obtain the zero standoff curve directly. Then, the slope of the zero standoff curve of FIG. 8 may provide the ordinate intercept of the curve of FIG. 9 which could be constructed to find the geometric constant by providing one mere calibration curve, for non-obtaining zero standoff, in FIG. 8. The "formations" used in obtaining the zero standoff calibration curve directly are liquids of different known densities. Appropriate conversion of density units, for example between electron density and limestone equivalent density, is well known.

This zero standoff curve, which is plotted in FIG. 8, provides, for a given measured count rate, the corresponding measured average density value of the environment of the detector, or $\rho$, for the detector in question, considered plotted along the abscissa of FIG. 8. Thus, count rate data obtained by processing the output signal from the detector in question can be translated into average environment density values (e.g. $\rho_1$ or $\rho_r$ in Equations 4 and 5) measured by the detector, by using the zero standoff calibration curve of FIG. 8.

It will be appreciated that the several curves of FIG. 8 intersect at the water point, which corresponds to a count rate obtained for a total environment of water which has a known electron density of 1.1 gm/cc. The tool may be placed in a total water environment, and the detector count rate obtained and plotted on FIG. 8 at 1.1 gm/cc density.

The sensitivity of the measuring apparatus 10 may be selectively altered by changing the geometry of the detectors, that is, their placement relative to the radiation source 24, to change their geometric constants. For example, the variation of sensitivity of measuring apparatus depending on detector geometric constant is illustrated in the graph of FIG. 10 for a tool diameter of 7.0 inches in a 9.0 inch diameter borehole. Three different geometric k constants are considered, the geometric constants being 0.35, 0.65 and 1.35 corresponding to the detector being positioned progressively closer to the radiation source, respectively. A formation bulk density of 2.6 gm/cc surrounds the measuring apparatus, and mud of density 1.2 gm/cc surrounds the measuring apparatus in the borehole. The curves for the three different geometric k constants intersect at the point representing these two densities. Different values for the mud density were assumed, and the corresponding apparent density values calculated utilizing an equation of the form of Equation 14. The resulting apparent density values were plotted as a function of the assumed mud density values for each detector geometric constant.

The resulting graph of FIG. 10 shows the size in errors in apparent density values that would be obtained if incorrect mud density values were assumed, for example. Additionally, the graph demonstrates how the measuring apparatus may be designed to select the sensitivity of the tool. For example, detectors positioned relatively close to the radiation source, and therefore having higher geometric constants, will have a stronger dependence on the mud density in the borehole than detectors spaced farther from the geometric source, that is, particularly in axial displacement from the source, and therefore having lower geometric k constants. Thus, measuring apparatus may be constructed that is relatively insensitive to the density of the borehole fluid, or, conversely, measuring apparatus may be constructed which enhances the dependence of the output data on the mud density, whereby the measuring apparatus may be used to measure the borehole fluid density more accurately.

Figure 11:
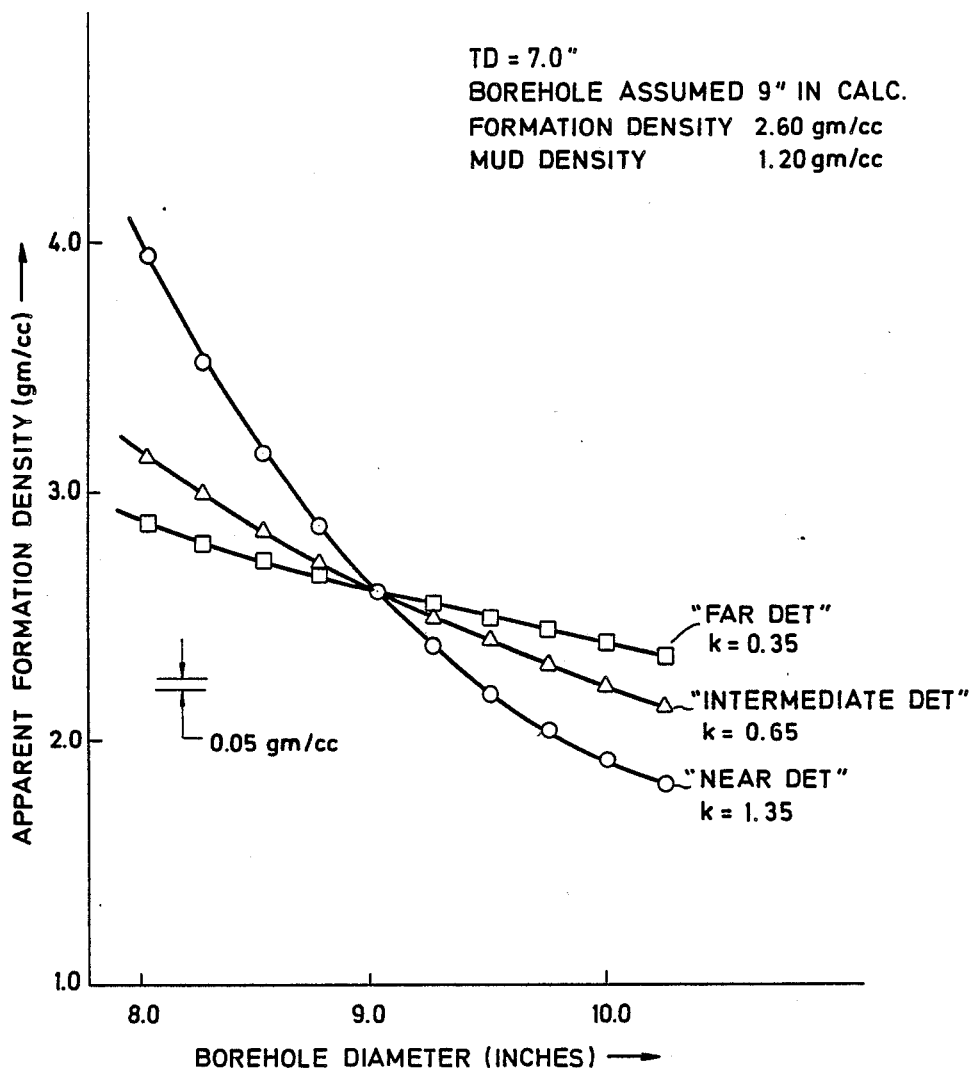
FIG. 11 is a graphical representation of the dependence of the apparent formation density on the geometric constant as a function of the borehole diameter.

FIG. 11 provides a graph which is similar to that of FIG. 10, except that in FIG. 11 the sensitivity of the measuring apparatus in determining borehole diameters, as a function of the detector geometric constant, is demonstrated. Again, a 9.0 inch diameter borehole is indicated, the bulk density of the formation is given as 2.60 gm/cc, and the borehole fluid density is 1.20 gm/cc. The same detector geometric constants demonstrated in FIG. 10 are utilized for the presentation of FIG. 11. All three plotted curves intersected at the point representing the aforementioned bulk and mud density values. Different borehole diameters were then assumed, and the apparent matrix density was calculated using an equation of the form of Equation 14. The resulting curves once again demonstrate that a detector positioned closer to the radiation source, and therefore having a larger geometric constant, provides a greater sensitivity in the ability to determine the transverse dimension of the borehole.

FIG. 12 further demonstrates the dependence of the sensitivity of the measuring apparatus on the detector geometric constant for borehole diameter measurements. Data may be obtained from the graph of FIG. 11 for any given geometric constant, and additional graphs similar to that of FIG. 11 for the same geometric constant may be obtained (for the same or different borehole diameter) utilizing different values for the actual apparent formation density. For a given true apparent density (2.60 gm/cc in FIG. 11), different values for the borehole diameter are assumed, and the corresponding apparent density values obtainable from FIG. 11 or like graphs are noted, and plotted along the vertical axis of FIG. 12 as observed apparent density. For each selected borehole value, a straight line is obtained in FIG. 12 as illustrated. Since the correct borehole diameter is 9.0 inch, the straight line for the 9.0 inch borehole data has a slope of 1. It will be appreciated by reference to FIG. 12 that a very sensitive caliper may be obtained with the measuring apparatus of the present invention to determine borehole diameters, at least with an accuracy of 0.1 inch, for example.

The foregoing illustrates that, in general, the sensitivity of the measuring apparatus may be enhanced by placing the detectors closer to the radiation source. However, the distance which radiation from the source travels into the formation and is scattered back to the detectors increases as the detectors are moved axially farther from the source. This depth of penetration for scattered and detected radiation ultimately peaks as the detector is moved farther away from the radiation source along the axis of the tool. Consequently, to obtain information concerning the formation at significant depths into the formation from the borehole, and to obtain desired sensitivity of the measuring apparatus, the axial position of the detectors relative to the radiation source may be selectively adjusted to optimize the two measuring conditions, namely sensitivity and formation penetration.

As discussed herein, the present measuring apparatus need not be held against the borehole wall to obtain any of the measurements noted. Thus, inaccuracies due to a tool following a major elliptical axis, for example, of a borehole cross section are avoided. Further, while the measuring apparatus may be utilized in a stationary mode, the benefits of data averaging may be appreciated by operating the detectors while the measuring apparatus is being rotated, for example at 100 revolutions per minute.

With the radiation source positioned on the side of the tool sub as illustrated, it will be appreciated that, if the sub is against the wall of the borehole at the level of the radiation source, misleading data counts may be obtained. For example, if the radiation source is facing away from the borehole wall with the sub against the borehole wall, an overabundance of the radiation scatter occurs in the borehole fluid, and the detector counts may be misleadingly high. If the radiation source is pressed against the borehole wall, virtually all of the radiation may enter the formation with little or no initial scattering in the borehole fluid, and the radiation will interact directly with the formation before having had any opportunity to travel axially in the borehole so that the data counts may be misleadingly low. Rotating the measuring apparatus while it is in operation to obtain averaging effects will alleviate such misleading count rate problems. A subgauge stabilizer may be used about the sub 12 to keep it from being positioned too close to the borehole wall to avoid such problems as well. The subgauge stabilizer, which may also be used even with the tool being rotated during measuring operations, would not interfere with steering of the drill bit, for example.

The present invention does not require the use of collimation to define radiation beams from the source or to the detectors, since there is no such dependence on direction built into Equation 14, for example. If a direction sensor is utilized in conjunction with the present measuring apparatus, and the measuring apparatus is not rotated during measurement operations, then details of the formation and borehole profile as functions of direction may be observed, even without collimation of the radiation.

The present invention thus provides a technique for simultaneous measurement of multiple downhole parameters by utilizing two or more pairs of diametrically opposed detectors, and may be employed in any appropriate fashion, such as in a measuring-while-drilling mode or suspended by a wireline, for example. The capability of making all measurements simultaneously to provide sufficient data to determine multiple downhole parameters avoids the inaccuracies that accompany measurements made after delays have allowed conditions in the borehole to change (mud caking, etc.), and where measurements are made during the drilling process or during wireline logging, avoids unduly axially extending the region in which measurements are being made, so that measurements to obtain all parameters are made at the same location.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. Apparatus for measuring downhole parameters in a borehole, comprising:
    a. a generally elongate housing having a longitudinal axis;
    b. a source of gamma radiation carried by said housing so that radiation from said source may be emitted outside said housing; and
    c. radiation detection means carried by said housing and comprising first and second pairs of detectors, said first pair of detectors including first and second detectors positioned diametrically opposite each other on opposite sides of said longitudinal axis of said housing, and said second pair of detectors including third and fourth detectors positioned diametrically opposite each other on opposite sides of said longitudinal axis of said housing such that the configuration of the combination of said first pair of detectors and said radiation source is different from the configuration of the combination of said second pair of detectors and said radiation source;
    d. said detectors being for sensing radiation from the environment of said housing due to radiation emitted from said radiation source and interacting with said environment.

2. Apparatus as defined in claim 1 further comprising signal processing means for providing data signals which are indicative of the radiation count rates of said detectors.

3. Apparatus as defined in claim 2 whereby said signal processing means combines output signals from two of said detectors to provide a single data signal indicative of the count rates of said two detectors operating as a single detector.

4. Apparatus as defined in claim 1 wherein said first and second pairs of detectors are positioned at different axial displacements along said longitudinal axis relative to said radiation source.

5. Apparatus as defined in claim 1 wherein said first and second detectors are positioned symmetrically relative to said radiation source.

6. Apparatus as defined in claim 1 wherein said first and second detectors are positioned asymmetrically relative to said radiation source.

7. Apparatus as defined in claim 6 wherein said first detector is circumferentially aligned about said longitudinal axis of said housing at an azimuthal angle of zero degrees relative to the position of said radiation source, and said second detector is so aligned at an azimuthal angle of 180° relative to said radiation source.

8. Apparatus as defined in claim 1 wherein said detection means comprises at least one additional such pair of detectors including detectors positioned mutually diametrically opposed on opposite sides of said housing longitudinal axis and in a unique configuration relative to said radiation source.

9. Apparatus as defined in claim 1 wherein said housing is positioned within said borehole by means of a pipe string.

10. Apparatus as defined in claim 1 wherein said housing is supported in said borehole by flexible line means.

11. A system for logging a borehole and providing simultaneous measurement for at least two parameters of the borehole environment, comprising:
    a. a generally elongate housing having a longitudinal axis;
    b. a source of gamma radiation carried by said housing so that radiation from said source may be emitted outside said housing; and
    c. radiation detection means carried by said housing and comprising first and second pairs of detectors, said first pair of detectors including first and second detectors positioned diametrically opposite each other on opposite sides of said longitudinal axis of said housing, and said second pair of detectors including third and fourth detectors positioned diametrically opposite each other on opposite sides of said longitudinal axis of said housing such that the configuration of the combination of said first pair of detectors and said radiation source is different from the configuration of the combination of said second pair of detectors and said radiation source;
    d. said detectors being for sensing radiation due to said radiation source and scattered by fluid in said borehole and by the underground formation adjacent thereto at the level of said housing so as to provide simultaneous measurement for at least two parameters of the borehole environment.

12. A system as defined in claim 11 further comprising signal processing means for providing data signals which are indicative of the radiation count rates of said detectors.

13. A system as defined in claim 12 whereby said signal processing means combines output signals from two of said detectors to provide a single data signal indicative of the count rates of said two detectors operating as a single detector.

14. A system as defined in claim 11 wherein said first and second pairs of detectors are positioned at different axial displacements along said longitudinal axis relative to said radiation source.

15. A system as defined in claim 11 wherein said first and second detectors are positioned symmetrically relative to said radiation source.

16. A system as defined in claim 11 wherein said first and second detectors are positioned asymmetrically relative to said radiation source.

17. A system as defined in claim 16 wherein said first detector is circumferentially aligned about said longitudinal axis of said housing at an azimuthal angle of zero degrees relative to the position of said radiation source, and said second detector is so aligned at an azimuthal angle of 180° relative to said radiation source.

18. A system as defined in claim 11 wherein said detection or means comprises at least one additional such pair of detectors including detectors positioned mutually diametrically opposed on opposite sides of said housing longitudinal axis and in a unique configuration relative to said radiation source.

19. A system as defined in claim 11 included in a drill string so that scattered radiation may be detected by said detectors in a measuring-while-drilling mode.

20. A system as defined in claim 11 wherein said housing is supported in said borehole by a wireline.

21. A method of logging a borehole to simultaneously obtain data to determine at least two downhole parameters associated with such borehole, comprising the following steps:
 a. providing a generally elongate housing, having a longitudinal axis, and carrying a source of gamma radiation positioned on the housing so that, when the housing is located within the borehole, radiation from the source may disperse to and interact with fluid in the borehole and with the underground formation at the level of the housing;
 b. providing first and second pairs of radiation detectors carried by the housing, with the first detector pair including first and second detectors positioned mutually diametrically opposite each other on opposite sides of the longitudinal axis of the housing, and the second detector pair including third and fourth detectors positioned mutually diametrically opposite each other on opposite sides of the longitudinal axis of the housing, and such that the geometric configuration of the combination of the first detector pair and the radiation source is different from the geometric configuration of the combination of the second detector pair and the radiation source; and
 c. positioning the housing within the borehole, and, with said detectors, sensing radiation reaching the detectors from the formation at the level of the housing and from the fluid in the borehole, and generating data signals indicative of the radiation counts obtained by the detectors in response to the radiation incident thereon.

22. A method as defined in claim 21 wherein the step of positioning the housing within the borehole is carried out by means of a wireline extending to the surface.

23. A method as defined in claim 21 wherein the housing is included in a drill string and the logging procedure is carried out in a measuring-while-drilling mode.

24. A method as defined in claim 21 wherein the housing is rotated relative to the borehole while the detectors are so sensing radiation to provide detector output signals.

25. A method as defined in claim 21 further comprising the steps of combining output signals from two detectors to produce a single data signal indicative of the radiation sensed by the combination of these two detectors, and combining output signals from the remaining two detectors to produce a single data signal indicative of the radiation sensed by the combination of these remaining two detectors.

26. A method as defined in claim 21 wherein the first and second detectors are provided at a different axial displacement relative to the radiation source compared to the axle displacement of the third and fourth detectors relative to the radiation source.

27. A method as defined in claim 21 wherein the first and second detectors are provided positioned symmetrically relative to the radiation source.

28. A method as defined in claim 21 wherein the first and second detectors are provided positioned asymmetrically relative to the radiation source.

29. A method as defined in claim 28 wherein the first detector is positioned circumferentially aligned about the longitudinal axis of the housing at an azimuthal angle of zero degrees relative to the position of the radiation source, and the second detector is so aligned at an azimuthal angle of 180° relative to the position of the radiation source.

30. A method as defined in claim 21 further including the step of providing at least one additional pair of detectors including detectors positioned mutually diametrically opposed on opposite sides of the longitudinal axis of the housing and combining with the radiation source in a geometric configuration different from the geometric configurations of the combinations of the first detector pair with the radiation source and the second detector pair with the radiation source, and processing the output signals from the additional detectors to produce data signals indicative of the radiation sensed by these detectors.

31. A method as defined in claim 21 including the step of determining the density of the borehole fluid as one of the downhole parameters.

32. A method as defined in claim 21 including the step of determining the bulk density of the formation at the level of the housing as one of the downhole parameters.

33. A method as defined in claim 21 including the step of determining a transverse dimension of the borehole at the level of the housing as one of the downhole parameters.

34. A method as defined in claim 21 comprising the additional step of obtaining the average density of the environment of the housing from the radiation count rates of the detectors.

* * * * *